United States Patent
Takakura et al.

[11] Patent Number: 5,987,394
[45] Date of Patent: Nov. 16, 1999

[54] APPARATUS FOR PREPARING VEHICLE DIAGNOSING PROGRAM

[75] Inventors: Keiji Takakura, Saitama-ken; Hiroyuki Aiba, Tochigi-ken, both of Japan

[73] Assignee: Honda Giken Kogyo Kabushiki Kaisha, Tokyo, Japan

[21] Appl. No.: 09/021,952

[22] Filed: Feb. 11, 1998

[30] Foreign Application Priority Data

Mar. 31, 1997 [JP] Japan ................................. 9-080574

[51] Int. Cl.⁶ ............................................. G01M 17/007
[52] U.S. Cl. ............................ 702/123; 701/1; 701/35; 701/36; 701/115; 702/183
[58] Field of Search ................. 72/123, 183; 701/29, 701/30, 32, 33, 34, 35, 1, 36; 340/438

[56] References Cited

U.S. PATENT DOCUMENTS

| | | | |
|---|---|---|---|
| 4,757,463 | 7/1988 | Balllou et al. | 701/35 |
| 4,975,846 | 12/1990 | Abe et al. | 701/32 |
| 4,996,643 | 2/1991 | Sakamoto et al. | 701/32 |
| 5,010,487 | 4/1991 | Stonehocker | 701/29 |
| 5,473,540 | 12/1995 | Schmitz | 702/123 |
| 5,572,424 | 11/1996 | Kellogg et al. | 701/29 |

FOREIGN PATENT DOCUMENTS

| | | |
|---|---|---|
| 7-76724 | 8/1995 | Japan . |
| 1591148 | 6/1981 | United Kingdom . |
| 2247757 | 3/1992 | United Kingdom . |

*Primary Examiner*—Marc S. Hoff
*Assistant Examiner*—Hien Vo
*Attorney, Agent, or Firm*—Armstrong, Westerman, Hattori, McLeland & Naughton

[57] ABSTRACT

An apparatus for preparing a vehicle diagnosing program which diagnoses a vehicle via an electronic control unit mounted on the vehicle automatically prepares diagnosing function programs. Each of the diagnosing function programs is made up of a plurality of diagnosing steps arranged in an appropriate order and is prepared by setting a parameter in each of the diagnosing steps. The vehicle diagnosing program is prepared by selecting and combining the diagnosing function programs in an order of performing the vehicle diagnosing function programs for each kind of electronic control unit.

1 Claim, 4 Drawing Sheets

FIG. 4

| No | SYMBOL | OPERATION | CONDITION 1 | CONDITION 2 | YES | NO | REMARKS |
|---|---|---|---|---|---|---|---|
| US1 | V1 | > : [SYMBOL] LARGER THAN [CONDITION 1] ? | α | * | 2 | 3 | |
| US2 | V2 | > : [SYMBOL] LARGER THAN [CONDITION 1] ? | α | * | 5 | 4 | |
| US3 | V2 | > : [SYMBOL] LARGER THAN [CONDITION 1] ? | α | * | 4 | 5 | |
| US4 | C | COUNTER UP : ADD 1 TO [SYMBOL] | * | * | 5 | * | |
| US5 | V2 | = : SUBSTITUE [CONDITION 1] FOR [SYMBOL] | V1 | * | 6 | * | |
| US6 | * | END : EXIT | * | * | * | * | EXIT |

APPARATUS FOR PREPARING VEHICLE DIAGNOSING PROGRAM

BACKGROUND OF THE INVENTION

1. Field of the Invention

The present invention relates to an apparatus for preparing a vehicle diagnosing program which is used for diagnosing a vehicle via an electronic control unit (ECU) which is mounted on the vehicle.

2. Description of the Related Art

There has hitherto been known the following art, for example, in the Japanese Published Examined Patent Application No. 76724/1995. Namely, diagnosing programs each of which is prepared for exclusive use by each kind of electronic control unit mounted on a vehicle are all stored in a memory portion of a vehicle diagnosing apparatus. Then, a diagnosing program corresponding to the kind of electronic control unit which is mounted on the vehicle to be diagnosed is called up to thereby perform the diagnosing of the vehicle.

The diagnosing programs to be used in the above-described prior art are prepared by a professional programmer for each kind of electronic control unit by using programming languages such as programming language C, an assembler, or the like. Therefore, when it becomes necessary to modify the diagnosing program due to a change in the specifications of a vehicle as a result of a model change of the vehicle or as a result of an amendment of related regulations, or the like, or when it becomes necessary to newly prepare a diagnosing program which corresponds to a new kind of vehicle, the diagnosing program must be modified, or prepared, by the professional programmer by spending much of his or her time.

In view of the above-described problem, the present invention has an object of providing an apparatus for preparing a diagnosing program in a short period of time even by a person, other than a professional programmer, who has no professional knowledge.

SUMMARY OF THE INVENTION

In order to attain the above and other objects, the present invention is an apparatus for preparing a vehicle diagnosing program which diagnoses a vehicle via an electronic control unit mounted on the vehicle. The apparatus comprises: means for automatically preparing diagnosing function programs each of which is made up of a plurality of diagnosing steps arranged in an appropriate order, the preparing being made by setting a parameter in each of the diagnosing steps; and means for preparing the vehicle diagnosing program by selecting and combining the diagnosing function programs in an order of performing the vehicle diagnosing function programs for each kind of electronic control unit.

Even if the kind of electronic control unit is different, there is a case in which the diagnosing program is not widely different but is different only in the parameter in each of the diagnosing steps. In addition, even in a case in which the differences lie not only in the parameters, the differences can still be coped with by replacing diagnosing steps or by changing the order of arranging the diagnosing steps. Therefore, the diagnosing steps that are the smallest units to constitute the diagnosing program are tied together (or compiled) into some diagnosing function programs for respective functions to be diagnosed. Then, by appropriately combining together the diagnosing function programs depending on the kind of electronic control unit, the diagnosing program which suits the kind of electronic control unit is prepared. Further, even in case the same function is diagnosed, the parameters may vary with the kind of electronic control unit. In such a case, it is so arranged that the diagnosing function programs can be automatically prepared or modified by setting or modifying the parameters.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 4 is a table to show an example of a screen to set parameters in diagnosing steps.

DETAILED DESCRIPTION OF A PREFERRED EMBODIMENT

Figure 1:
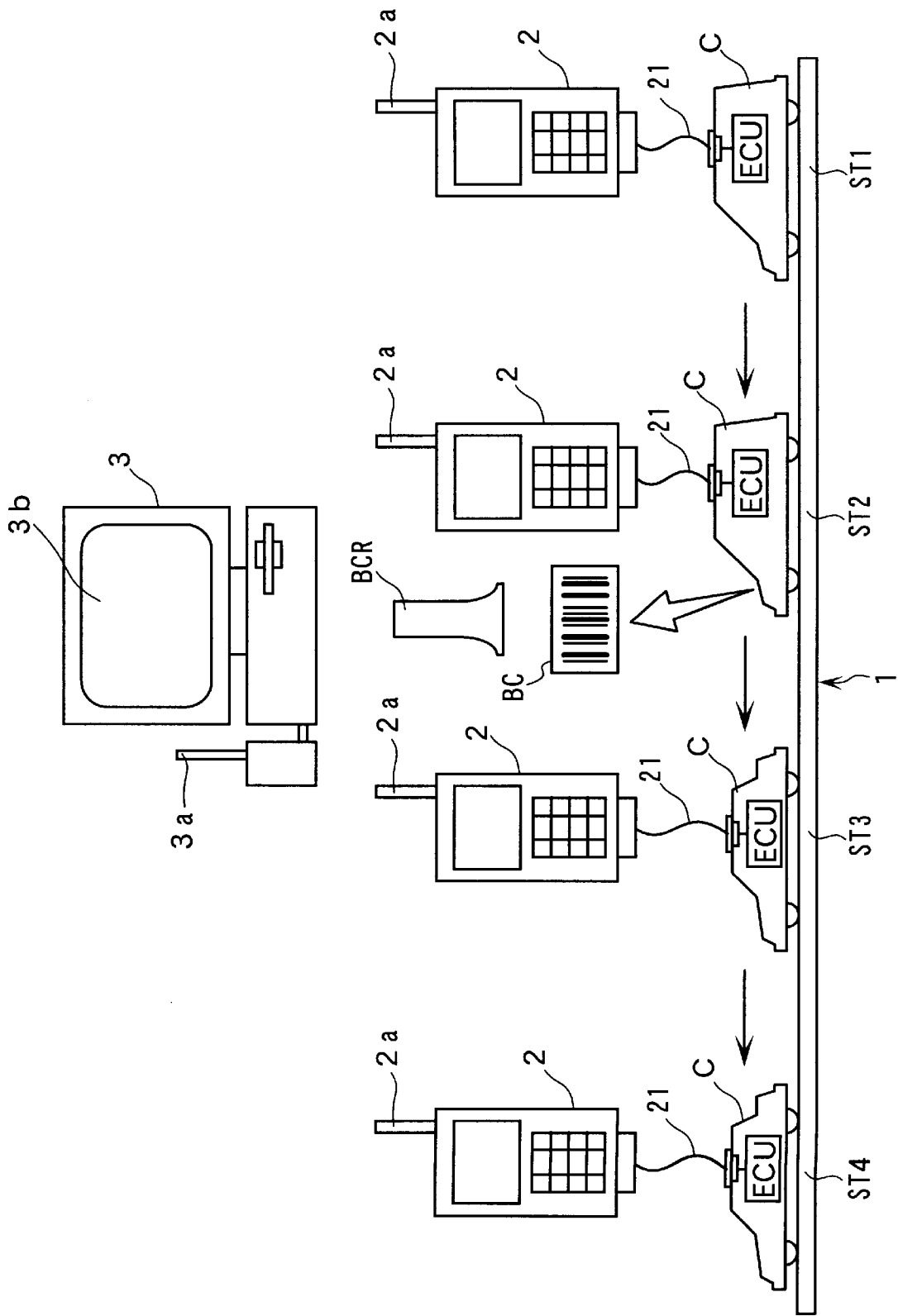
FIG. 1 is a schematic diagram to show the arrangement of one example of the vehicle diagnosing line using the diagnosing program by the present invention.

With reference to FIG. 1, reference numeral 1 denotes a vehicle diagnosing line on which vehicles C are diagnosed. Vehicles C each having mounted thereon an electronic control unit (ECU) are sequentially transported from station ST1 toward station ST4 at a constant frequency. Reference numeral 2 denotes a portable diagnosing unit which is connected, via a cable 21, to the electronic control unit on each of the vehicles C. Each of the vehicles C has a vehicle number which is peculiar to each thereof and is indicated in the form of a bar code BC. The bar code BC is read by a bar code reader BCR in station ST2. In the vicinity of the vehicle diagnosing line 1, there is disposed a host computer 3. The diagnosing unit 2 is provided with an antenna 2a, and another antenna 3a is connected to the host computer 3 to thereby perform bidirectional wireless communication between the diagnosing unit 2 and the host computer 3 via the antennas 2a, 3a. Data required for diagnosing, and a vehicle diagnosing program, or the like are transmitted from the host computer 3 to the diagnosing unit 2. The diagnosing data, which represent the results of diagnosing of the vehicle, and the other data are transmitted from the diagnosing unit 2 to the host computer 3.

Figure 2:
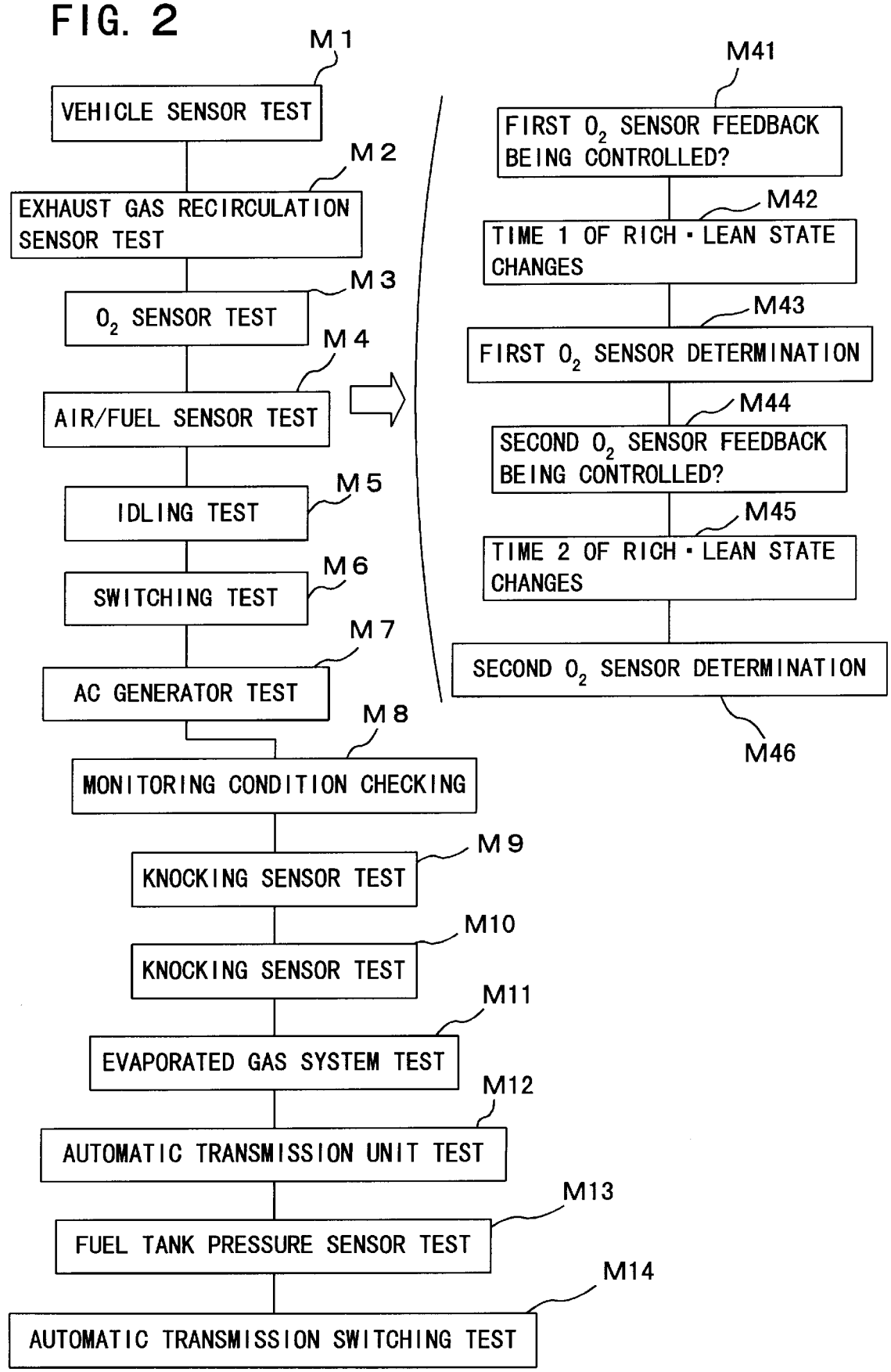
FIG. 2 is a flow chart to show one example of the diagnosing program.

This host computer 3 also functions as an apparatus for preparing the vehicle diagnosing program. It prepares or modifies the diagnosing program corresponding to the kind of electronic control unit. The diagnosing program is shown, for example, in FIG. 2. It is made up by combining diagnosing function programs M1 through M14, which are called modules, in the order in which they are performed. The contents and order of the combination can be freely set and modified and stored as flag data. Among these modules M1 through M14, module M4 is shown as an example. Module M4 is made up of minor (or smaller) modules M41 through M46. The example illustrated herein is for use with an electronic control unit which is mounted on a vehicle provided with two $O_2$ sensors for measuring the oxygen concentration in the exhaust gas. Therefore, in a diagnosing program for use with an electronic control unit which is mounted on a vehicle having different number of $O_2$ sensors, the combination of the minor modules will be different from the combination which constitutes the module M4, even if there exists, in the diagnosing program, a module for performing the same function as does the module M4. The combination of the minor modules which constitute each module is also changed with respect to the other modules, depending on the specifications of the vehicle.

Figure 3:
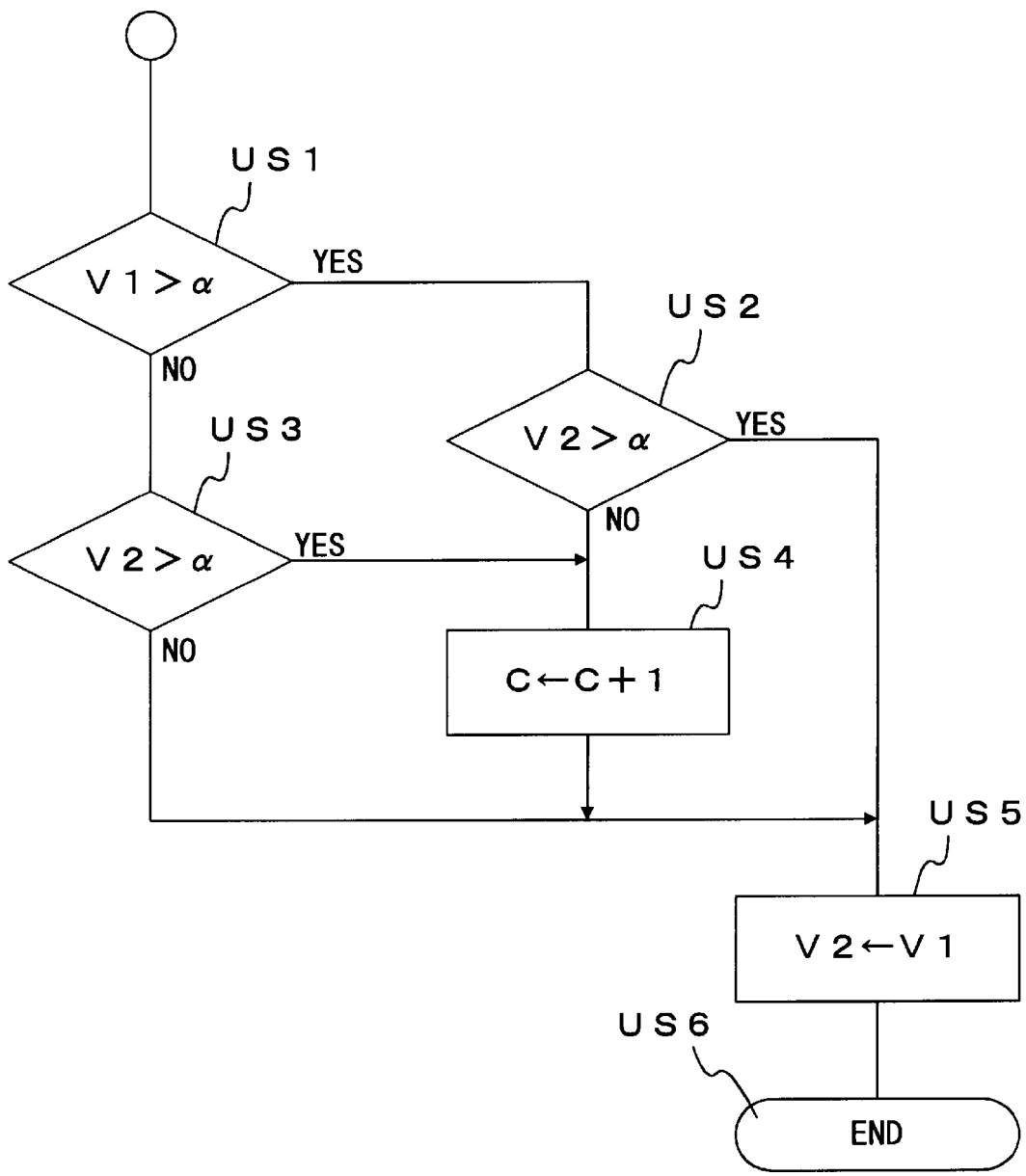
FIG. 3 is a flow chart to show one example of combination of the diagnosing steps.

An explanation will now be made, among the minor modules M41 through M46, about the minor module M42, for example. The minor module M42 is made up of the diagnosing steps US1 through US5 as shown in FIG. 3. Here, reference character V1 denotes a value which is outputted from the electronic control unit to the diagnosing unit 2 during the diagnosing operation. Reference character V2 denotes an ordinary variable which is prepared inside the diagnosing unit 2. Reference roman letter C denotes a counter, and reference Greek letter a denotes a constant which is defined depending on the kind of vehicle. In the flow chart shown in FIG. 3, only when either V1 or V2 is larger than the constant α, 1 is added to the counter C (US4), wherein V1 is a value actually outputted from the electronic control unit and V2 is a value obtained by storing, as an ordinary variable, a value that was obtained in the last diagnosing. Thereafter, the value of V1 is replaced by V2 (US5). Further, when both V1 and V2 are larger than α, or when both V1 and V2 are smaller than α, the value of V1 is replaced by V2 without adding 1 to the counter C.

When the flow chart shown in FIG. 3 is actually used as (or converted to) the minor module M42, it has conventionally been the practice for a professional programmer to prepare the minor module M42 by using a programming language. In the present invention, on the other hand, as shown in FIG. 4, each of the diagnosing steps US1 through US6 of the minor module M42 are displayed on a monitor 3b of the host computer 3 in the form of a table. By thereafter setting parameters in the table, the minor module M42 is automatically prepared. In the table, the following definitions are made. Namely, a diagnosing step US1, for example, is to make a comparison with respect to a symbol value V1. If the symbol value V1 is larger than α, which is a parameter indicated as a condition 1, the program proceeds to a diagnosing step US2 which is instructed by the number "2" written in a column of "YES" of the diagnosing step US1. If the symbol value V1 is smaller than α, the program proceeds to diagnosing step US3. Therefore, when it becomes necessary to change the value α to a different value due to a change in the specification of the vehicle, it is necessary only to change the value α in the diagnosing steps US1 through US3 in the table to a new value. In addition, even when the diagnosing steps are increased or decreased, or when the flow of processing is changed, it is enough to change the contents of the table. It follows that even a person other than a professional programmer can change the contents of the diagnosing steps.

In the above-described explanation, in order to facilitate the understanding, an explanation was made only about the changes which are made to the existing diagnosing programs. When diagnosing programs are newly prepared, the following steps may be taken. Namely, a plurality of required number of minor modules are prepared by using the table shown in FIG. 4. Modules are then prepared by combining the minor modules. Thereafter, the flag data for defining the combinations of the modules are prepared, and the diagnosing program is then prepared by combining the modules in accordance with the flag data.

After having read out the bar code BC, the host computer 3 specifies (or recognizes), based on the kind of vehicle read by the bar code BC, the kind of electronic control unit mounted on that particular kind of vehicle. Then, a comparison is made between the kind of electronic control unit diagnosed right before (i.e., the electronic control unit before the one to be diagnosed this time) and the kind of electronic control unit to be diagnosed this time. If the kind of electronic control unit to be diagnosed this time is different from the kind of electronic control unit that was diagnosed right before, a diagnosing program is transmitted from the host computer 3 to the diagnosing unit 2. By thus transmitting the diagnosing program from the host computer 3 to the diagnosing unit 2 each time the kind of electronic control unit to be diagnosed is changed, the memory (or storing) capacity of the diagnosing unit 2 can be made smaller than the one in which a plurality of diagnosing programs are stored in advance in the diagnosing unit 2.

As can be seen from the above-described explanations, according to the present invention, the diagnosing function programs can be automatically prepared only by setting parameters in the diagnosing steps. Therefore, the diagnosing program can be prepared in a short time even by a person who has no professional knowledge of the professional computer programmer.

It is readily apparent that the above-described apparatus for preparing a vehicle diagnosing program meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for preparing a vehicle diagnosing program which diagnoses a vehicle via an electronic control unit mounted on the vehicle, said apparatus comprising:

means for comparing between a previously diagnosed kind of electronic control unit and a kind of electronic control unit to be currently diagnosed:

means for transmitting said vehicle diagnosing program into a diagnosing means external to said vehicle, said diagnosing means having a memory capacity determined by said vehicle diagnosing program;

means for automatically preparing function program each of which is made up of a plurality of diagnosing steps arranged in an appropriate order, said preparing being made by setting a parameter in each of said diagnosing steps; and means for preparing the vehicle diagnosing program by selecting and combining said diagnosing function programs in an order of performing said vehicle diagnosing function programs for each kind of electronic control unit.

* * * * *

UNITED STATES PATENT AND TRADEMARK OFFICE
CERTIFICATE OF CORRECTION

PATENT NO.: 5,987,394
DATED : November 16, 1999
INVENTOR(S): TAKAKURA et al.

It is certified that errors appear in the above-identified patent and that said Letters Patent is hereby corrected as shown below:

In the Claims on line 11 of claim 1, change "means for automatically preparing function program each" to be --means for automatically preparing diagnosing function programs each--.

Signed and Sealed this

Eighth Day of August, 2000

Attest:

Q. TODD DICKINSON

Attesting Officer

Director of Patents and Trademarks